US012515605B2

(12) United States Patent
Gupta et al.

(10) Patent No.: US 12,515,605 B2
(45) Date of Patent: Jan. 6, 2026

(54) VEHICLE CABIN-BASED TARGET DETECTION AND TRACKING

(71) Applicant: GM GLOBAL TECHNOLOGY OPERATIONS LLC, Detroit, MI (US)

(72) Inventors: Siddhartha Gupta, Rochester Hills, MI (US); Sean T. Coughlin, Shelby Township, MI (US); Maria del Mar Davila, Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 75 days.

(21) Appl. No.: 18/654,248

(22) Filed: May 3, 2024

(65) Prior Publication Data

US 2025/0340180 A1 Nov. 6, 2025

(51) Int. Cl.
*B60R 21/015* (2006.01)
*G06V 20/59* (2022.01)
*B60R 21/01* (2006.01)

(52) U.S. Cl.
CPC .. *B60R 21/01556* (2014.10); *B60R 21/01538* (2014.10); *G06V 20/59* (2022.01); *B60R 2021/01245* (2013.01)

(58) Field of Classification Search
CPC ........ B60R 21/01538; B60R 21/01512; B60R 21/01556; B60R 2021/01211; B60R 2021/01245; G06V 20/59–593
See application file for complete search history.

(56) References Cited

U.S. PATENT DOCUMENTS

| 5,890,085 A | * | 3/1999 | Corrado | B60R 21/01532 180/271 |
| 9,153,073 B2 | * | 10/2015 | Langlotz | G06T 11/00 |
| 10,303,961 B1 | * | 5/2019 | Stoffel | H04W 4/44 |
| 11,935,248 B2 | * | 3/2024 | Gronau | G06V 40/161 |
| 2025/0256672 A1 | * | 8/2025 | Rehfeld | B60R 21/01538 |

FOREIGN PATENT DOCUMENTS

| DE | 102021112630 A1 | | 4/2022 | |
| KR | 20220131702 A | * | 9/2022 | B60R 22/48 |

OTHER PUBLICATIONS

Lee, KR 20220131702, machine translation. (Year: 2022).*
Drygala, Rottmann, Gottschalk, Friedrichs, Kurbiel; Background-foreground segmentation for interior sensing in automotive industry; Journal of Mathematics in Industry, 2022, 12. Jg., Nr. 1, S. 13.

* cited by examiner

*Primary Examiner* — Mark L. Greene
(74) *Attorney, Agent, or Firm* — Quinn IP Law

(57) ABSTRACT

A target tracking system for use in a vehicle interior of a motor vehicle includes a target sensor and an electronic control unit (ECU). The target sensor, e.g., a red, green, blue (RGB) camera, RGB-infrared, or RGB-depth (RGBD) camera, is situated in the vehicle interior and outputs a sensor data stream of a seat surface. The ECU includes a processor and a non-transitory computer-readable storage medium on which is recorded instructions, execution of which by the processor causes the ECU to receive the sensor data stream of the seat surface and segment the sensor data stream into an output file. The ECU also detects a target on the seat surface using the output file, such as a child restraint system, and classifies the target into a target class. The ECU then executes a control action in response to the target class.

18 Claims, 5 Drawing Sheets

VEHICLE CABIN-BASED TARGET DETECTION AND TRACKING

INTRODUCTION

In a passenger compartment or cabin of a motor vehicle, vehicle seats are surrounded by or attached to one or more passenger restraint systems. For example, a given seat of a modern vehicle interior is equipped with at least one passenger restraint system in the form of a lap-and-shoulder seatbelt, inflatable airbag, seatbelt pretensioner, adjustable head restraint, knee bolster, or energy-absorbing device. Additional passenger restraint systems are specially configured for securing infants and toddlers within the vehicle interior, and thus are referred to as child restraint systems.

A child restraint system may take the form of a rear-facing or forward-facing car seat to provide protection to infants, toddlers, or older child passengers based on their height, weight, and age. Rear-facing car seats are specially configured for carrying newborn and infant passengers. Once a child passenger has outgrown the car seat, the child passenger may still use booster seat to elevate the child relative to a seat surface. This in turn helps ensure that the lap-and-shoulder belt is arranged properly across the child's torso.

SUMMARY

The solutions described in detail below are collectively operable for perceiving a location and orientation of a target within a vehicle cabin or interior and tracking the same through a series of collected images or other sensor data. The target may include a child restraint system (CRS) in one or more exemplary embodiments, with other targets in the form of objects or human or animal occupants being possible within the scope of the disclosure. For instance, implementation of the present teachings enables identification and tracking of cell phones, purses, packages, pets, or other predefined targets that may be situated on a surface of a vehicle seat and transported within the vehicle interior.

Detection as contemplated herein may occur within the vehicle interior using one or more target sensors, e.g., image sensors/cameras, radar sensors, Wi-Fi devices, ultrasonic sensors, structured light, ultrawide band sensors, or other image-based or non-image based sensors in different embodiments.

The target sensors are in communication with an electronic control unit (ECU) operable for executing a method as set forth herein. As part of the method, and depending on the nature of the sensors used in a particular application, the ECU may perform data (e.g., image) processing and deep learning methodologies on a received stream of sensor data to correctly identify the target object and thereafter trigger one or more control responses as needed.

According to an exemplary embodiment, a target tracking system for use in a vehicle interior of a motor vehicle includes a target sensor and an ECU. The target sensor is situated in the vehicle interior and configured to output a sensor data stream of a seat surface in the vehicle interior. The ECU is in communication with the target sensor and includes a processor and a non-transitory computer-readable storage medium. Instructions are recorded on the computer-readable storage medium, the execution of which causes the ECU to receive the sensor data stream of the seat surface, segment the sensor data stream into an output file, and detect a target on the seat surface using the output file. The ECU also classifies the target into a target class and executes a control action in response to the target class.

The target on the seat surface may optionally include a child restraint system (CRS), the motor vehicle may include a plurality of airbags, and the function of the motor vehicle may include inflation of one or more of the airbags. In such an embodiment, the target class includes an orientation of the CRS relative to the seat surface.

The target sensor in one or more optional embodiments includes a red, green, blue (RGB) camera, e.g., an RGB depth (RGBD) camera and/or an RGB infrared (RGB-IR) camera.

The ECU may include a fully convolutional neural network (FCN), which the ECU uses to segment the sensor data stream into the output file. In some implementations, execution of the instructions by the processor causes the ECU to calculate a segmentation mask (M) from the output file, and/or to detect the target on the seat surface using the output file by extracting a largest fully-connected region in the segmentation mask (M).

The ECU may be configured to extract the largest fully-connected region in the segmentation mask (M) using a Depth First Search (DFS) to identify pixel clusters or regions, and to select the largest fully-connected region from amongst the pixel clusters or regions.

Execution of the instructions by the processor may cause the ECU to execute the control action by selectively disabling a function of the motor vehicle based on the target class.

An aspect of the disclosure includes an external device in communication with the ECU. Execution of the instructions by the processor in such an embodiment causes the ECU to transmit a message to the external device.

A method is also disclosed herein for tracking a target in a vehicle interior of a motor vehicle. An embodiment of the method includes receiving from a target sensor, via an ECU of the motor vehicle, a sensor data stream of a seat surface in the vehicle interior, and then segmenting the sensor data stream into an output file via a fully convolutional neural network (FCN) of the ECU. The method may include detecting the target on the seat surface using the output file from the FCN, classifying the target into a target class via the ECU, and executing a control action, via the ECU, in response to the target class.

A motor vehicle is also disclosed herein, an embodiment of which includes a vehicle body defining a vehicle interior, and a target tracking system for use in the vehicle interior. The target tracking system may include at least one target sensor connected to the vehicle body and situated in the vehicle interior. The at least one target sensor is configured to output a sensor data stream of a seat surface in the vehicle interior, and wherein the target sensor includes an RGB camera. The target tracking system also includes an ECU in communication with the at least one target sensor. The ECU in one or more implementations receives the sensor data stream of the seat surface from the at least one target sensor, segments the sensor data stream into an output file using a fully convolutional neural network (FCN), and detects a target on the seat surface using the output file. The ECU also classifies the target into a target class and thereafter executes a control action in response to the target class.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The appended drawings are not necessarily to scale, and may present a simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments may be arranged in a variety of configurations. Thus, the following detailed description is not intended to limit the scope of the disclosure as claimed, but is merely representative of possible embodiments thereof. In addition, while numerous specific details are set forth in the following description to provide a thorough understanding of various representative embodiments, some embodiments may be capable of being practiced without some of the disclosed details. Moreover, in order to improve clarity, certain technical material understood in the related art has not been described in detail. Furthermore, the disclosure as illustrated and described herein may be practiced in the absence of an element that is not specifically disclosed herein.

Figure 1:
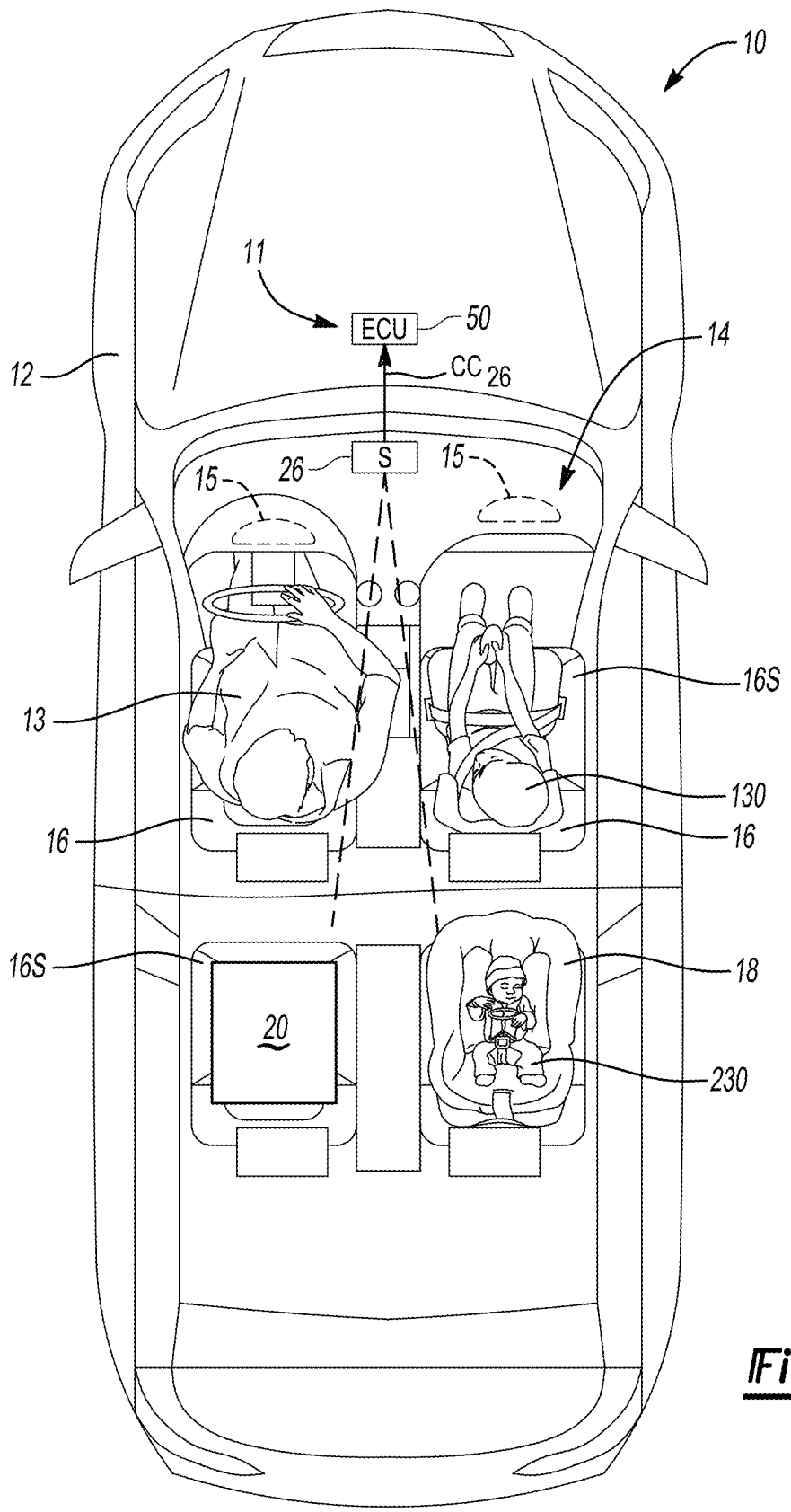
FIG. 1 schematically illustrates a representative motor vehicle having a vehicle interior and an electronic control unit (ECU) configured to identify and track a target in a vehicle interior in accordance with the present disclosure.

Referring now to the drawings, wherein like reference numbers refer to like features throughout the several views, FIG. 1 depicts a mobile system in the non-limiting representative form of a motor vehicle 10. The motor vehicle 10 includes a target tracking system 11 for use in a vehicle interior 14 of the motor vehicle 10, i.e., a passenger cabin defined by a vehicle body 12. The motor vehicle 10 includes a set of road wheels (not shown) connected to the vehicle body. While the motor vehicle 10 is depicted as being driven by an operator 13 and configured as a passenger vehicle, the present teachings may be applied to other vehicles and mobile systems, including but not limited to fully autonomous vehicles such as self-driving taxis, rail vehicles, farm equipment, etc. Solely for illustrative clarity, the motor vehicle 10 will be described herein in the non-limiting representative context of the passenger vehicle shown in FIG. 1.

The vehicle interior 14 may be equipped with one or more passenger restraint systems, for instance inflatable airbags 15 arranged around the various vehicle seats 16. Two inflatable airbags 15 are illustrated in FIG. 1 for simplicity and without limitation, i.e., the inflatable air bags 15 may include various front (driver and passenger side), seat-mounted, roof rail-mounted, etc. Additionally, a child restraint system (CRS) 18 may be secured to one or more of the vehicle seats 16 when transporting infants, toddlers, or other child passengers 130 or 230 in the vehicle interior 14. Other passengers may be situated in the vehicle interior 14 at various times, or the motor vehicle 10 may be used to transport a package 20 or other targets 25 (see FIG. 2).

As set forth in detail below, the target tracking system 11 includes an electronic control unit (ECU) 50 configured to identify and track the CRS 18, the package 20, and/or other target 25 (FIG. 2) with the assistance of one or more target sensors 26. The target sensors 26 are in wired or wireless communication with the ECU 50 such that a sensor data stream $CC_{26}$ is provided to the ECU 50 for processing by resident control logic 100L. The ECU 50, using the sensor data stream $CC_{26}$ and the control logic 100L, is thus configured to identify and track a detected target 25 within the vehicle interior 14. That is, within the scope of the present disclosure, the ECU 50 is configured to execute a computer-readable/executable instruction set embodying a method 100, a non-limiting example embodiment of which is described below with reference to FIG. 4. By executing the constituent steps or logic blocks of the method 100, the ECU 50 is able to generate output signals $CC_O$ to thereby request or perform a control action when needed based on the results of the method 100. Implementation of the method 100 is described below for the non-limiting use case of the target 25 being the CRS 18, with particular reference to FIGS. 3A-5.

Figure 2:
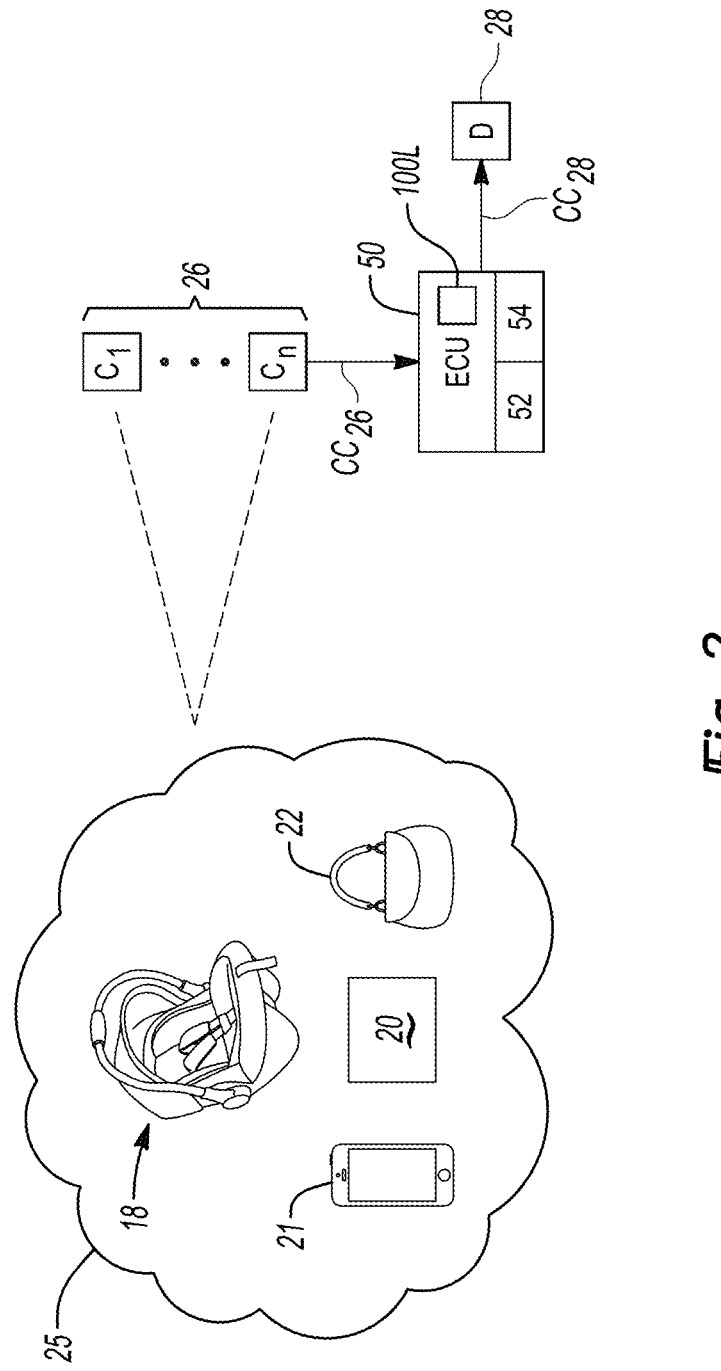
FIG. 2 is a flow diagram illustrating the ECU of FIG. 1 in an exemplary use scenario when identifying and tracking a target.

Referring briefly to FIG. 2, the ECU 50 of the target tracking system 11 shown in FIG. 1 also includes a set of target sensors(S) 26, which are also labeled $C_1, \ldots, C_n$ to represent the possibility of more than one target sensor 26 within the vehicle interior 14 of FIG. 1. In one or more non-limiting exemplary implementations, the target sensors 26 may be embodied as image sensors in the form of one or more red, green, blue (RGB) cameras, infrared (IR) cameras, RGB-IR cameras, RGB-depth (RGBD) cameras, and the like, the latter of which adds depth information, e.g., via a depth map/image created by a time-of-flight, stereo, or another three-dimensional depth sensor, as appreciated in the art. Thus, the sensor data stream $CC_{26}$ may be human-visible and/or of another spectrum within the scope of the disclosure. Other implementations as noted above may include, e.g., radar sensors, lidar sensors, Wi-Fi devices, ultrasonic sensors, ultrawide band sensors, and/or other image-based or non-image based sensors in different embodiments, and therefore the image-based implementations described herein are intended to be representative and non-limiting.

The target 25 as observed and tracked by the ECU 50 within the scope of the disclosure may vary with the intended application as noted above. For instance, the target 25 may include the CRS 18 or the package 20 of FIG. 1. Other possible targets 25 include cell phones 21 or other portable electronic devices, purses 22 or other handheld objects such as briefcases, shopping bags, other human or animal passengers/occupants, etc., or other items that may be situated on one of the vehicle seats 16 of FIG. 1. Ultimately, the ECU 50 identifies and tracks the target 25 and performs a suitable control action via the output signals ($CC_O$) to at least one external device (D) 28 in response to certain criteria, with the construction of the external device(s) 28 varying with the intended application.

For example, when the target 25 includes the CRS 18, the ECU 50 may prevent the deployment of one or more inflatable airbags 15 (FIG. 1) situated in proximity to the CRS 18. That is, rather than the ECU 50 relying solely on weight-based detection of a possible occupant of given vehicle seat 16, the ECU 50 is informed via the method 100 as to the position and orientation of the CRS 18 on the vehicle seat 16 within the vehicle interior 14. The ECU 50 may also issue alerts at an appropriate time, such as by displaying a message on a display screen while the operator 13 is still seated, or flashing lights, sounding a horn or another audible alert, etc., when the motor vehicle 10 is turned off and one or more of the doors are opened. Similar actions may be taken for other targets 25, for instance to alert a passenger upon exiting the vehicle interior 14 that the passenger may have left the package 20, cell phone 21, purse 22, or other target 25 in the vehicle interior 14. For example, such alighting passengers may receive a generated "retrieve object" message or alert.

The ECU 50 of FIGS. 1 and 2 as constructed herein may be embodied as microcontroller, electronic control unit, Application Specific Integrated Circuit(s) (ASIC), Field-Programmable Gate Array (FPGA), electronic circuit(s), central processing unit(s), e.g., microprocessor(s) and associated transitory and non-transitory memory/storage component(s). The ECU 50 is depicted schematically as having a processor 52 of one or more of such types, as well as a computer-readable storage medium or memory 54. The memory 54 includes at least one tangible, non-transitory computer storage medium/media (e.g., read only, programmable read only, solid-state, random access, optical, magnetic, etc.). The memory 54, on which computer-readable instructions embodying the method 100 of FIG. 4 may be recorded, is configured to store a machine-readable instruction set in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from the target sensors 26 and other possible sensors, with such inputs monitored at a preset sampling frequency or in response to a triggering event. Software, firmware, programs, instructions, control routines, code, algorithms, and similar terms mean controller-executable instruction sets including calibrations and look-up tables. Ultimately, the ECU 50 outputs the above-noted control signals $CC_O$ based on the results of the method 100.

Figure 3A:
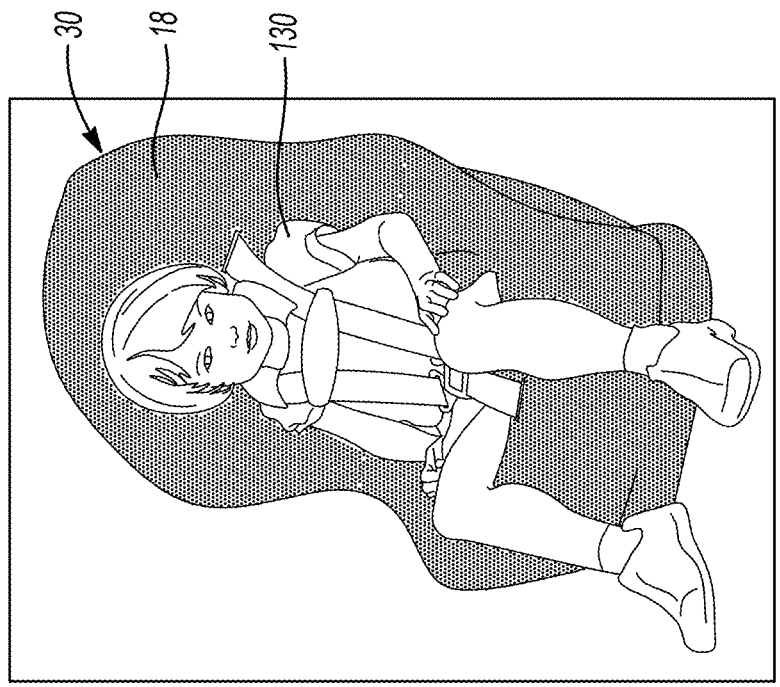
FIGS. 3A and 3B depict a representative target as detected in the vehicle interior of FIG. 1 and with an applied mask, respectively.

Referring now to FIG. 3A, and in keeping with the non-limiting example embodiment of the CRS 18, the sensor data stream $CC_{26}$ of FIGS. 1 and 2 may be captured as a real-time video feed in one or more implementations. In the collected sensor data stream $CC_{26}$ in such an embodiment, the child passengers 130 and/or 230 should be visible within most of the collected frames. However, the child passengers 130 and/or 230 could move around in the CRS 18 such that her position and orientation within the CRS 18 dynamically changes. Likewise, other passengers or objects in the vehicle interior 14 of FIG. 1 may temporarily block the field of view of the target sensor(s) 26 of FIGS. 1 and 2, such that neither the child passengers 130 and/or 230 nor the CRS 18 are visible in some of the representative image frames. In other words, the child passenger 130 and/or 230 may be a dynamic subject from the perspective of the target sensors 26. In contrast, the CRS 18 is largely static.

The present approach as performed by the ECU 50 therefore identifies and tracks the static CRS 18 in lieu of the potentially dynamic child passengers 130 and/or 230. To do so, the ECU 50 uses resident image processing and machine learning capabilities to automatically perceive the location and orientation of the CRS 18, with the ECU 50 also tracking the CRS 18 frame-by-frame in the data stream $CC_{26}$. Within the scope of the method 100, the CRS 18 is effectively masked off as shown by masked region 30 of FIG. 3B. As the unobscured boundaries of the CRS 18 as captured by the masked region 30 forms a static background from the perspective of the ECU 50, the motion and identity of the child passengers 130 and/or 230 are not considered. This reduces the computational load on the ECU 50.

Figure 4:
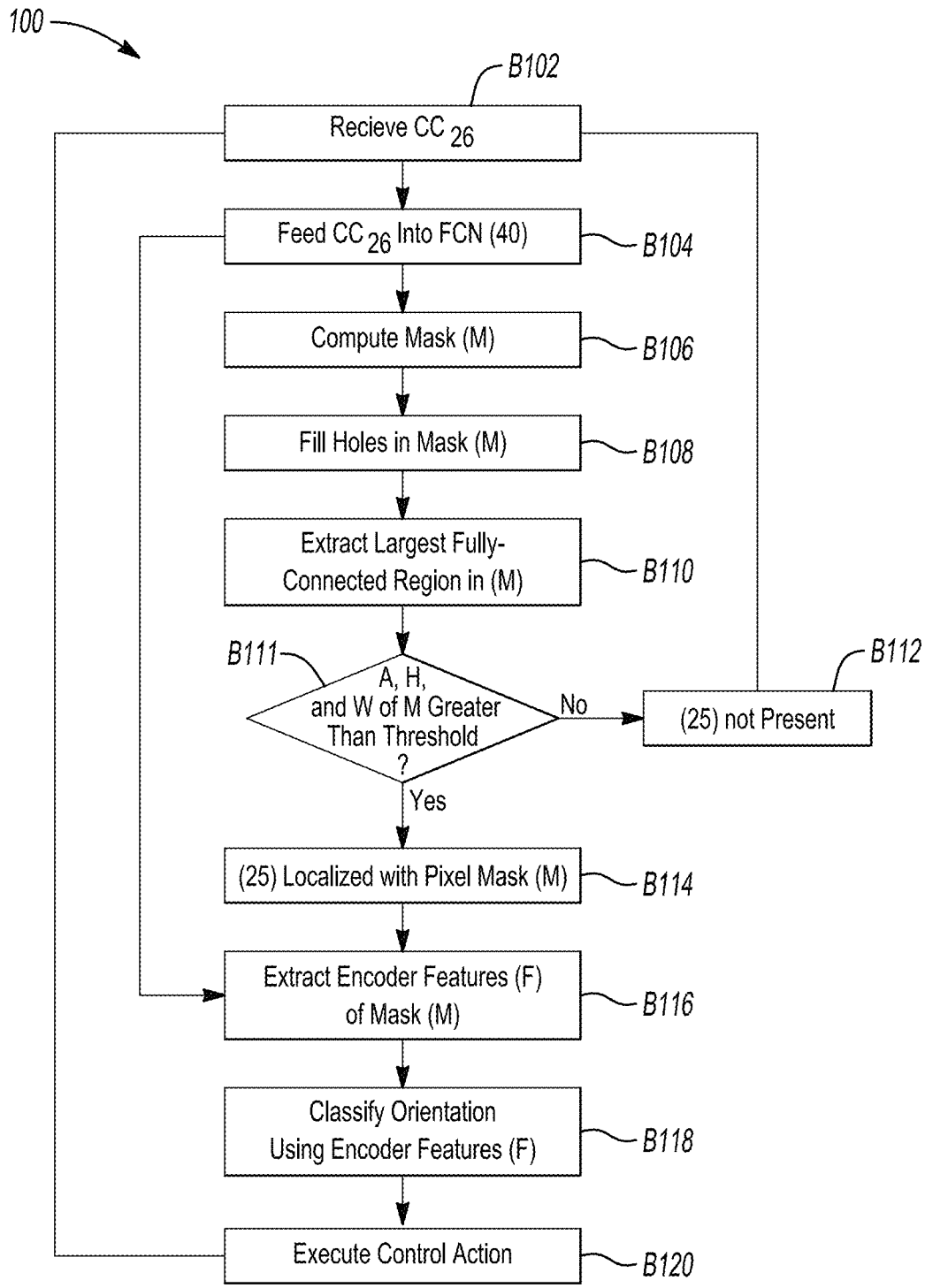
FIG. 4 is a flow chart describing an exemplary embodiment of a method for identifying and tracking a target in a vehicle interior.

Turning now to FIG. 4, the method 100 is described as a series of process steps or logic blocks for clarity. Each of the logic block B102-B120 may be executed by the processor 52 of the ECU 50 illustrated in FIGS. 1 and 2 in the course of a drive cycle of the motor vehicle 10. For instance, upon initiating a drive cycle via a key-on event of the motor vehicle 10, the ECU 50 may initialize, establish communication with the target sensors 26 over a controller area network or other suitable communication channels, and commence performance of the method 100.

As explained above, the object detection system of FIG. 1 that is provided for use in the vehicle interior 14 includes the target sensor(s) 26 situated in the vehicle interior 14. Each target sensor 26 is configured to output at least a portion of the sensor data stream $CC_{26}$ of the seat surface 16S in the vehicle interior 14 when searching for the presence or absence of the CRS 18 or other target 25. The ECU 50 as part of this effort is configured to receive the sensor data stream $CC_{26}$ of the seat surface 16S, segment the sensor data stream $CC_{26}$ into an output file 46 (FIG. 5), and detect the target 25 of FIG. 2 on the seat surface 16S using the output file 46. Additionally, the ECU 50 in this embodiment is configured to classify the target 25 into a target class, e.g., a given orientation of the CRS 18 in the non-limiting representative embodiment of FIG. 1, and to execute a control action in response to the target class, such that the output file 46 may include the target class.

A non-limiting exemplary embodiment of the method 100 commences with block B102 in a use case in which the target sensor 26 is constructed as an image sensor or camera (or multiples or arrays thereof), with the ECU 50 receiving the sensor data stream $CC_{26}$ (in this instance, an image data stream) from the one or more target sensors 26 shown schematically in FIGS. 1 and 2. Block B102 may include receiving the sensor data stream $CC_{26}$ in a particular spectrum, e.g., RGB, IR, or depth, or in a combined spectrum such as RGB-IR, RGBD, etc., as noted above. When using other sensor types such as radar, UWB, Wi-Fi, structured light, etc., the particular spectrum will vary with the particular sensor type, as appreciated in the art. The method 100 then proceeds to block B104.

Block B104 (Image Segmentation) includes feeding the sensor data stream $CC_{26}$ of block B102, in this non-limiting embodiment in which the target sensors 26 are image sensors, into an image segmentation routine to generate the output file 46. For instance, for an image (I) of height H and width W, where $I \in \mathbb{R}^{H \times W \times 3}$, then O may be described as $\in \mathbb{R}^{H \times W \times 2}$. As appreciated in the art, the process of image segmentation is used in machine vision applications to partition digital images into sets of pixels when identifying and locating specific target objects within the image. Thus, block B104 may include pre-processing for noise reduction, contrast improvement, edge sharpening, color balance, and the like. To differentiate among the constituent pixels or pixel clusters in the image, the ECU 50 may also extract identifying features of the target 25, in this instance the CRS 18 of FIG. 3A from other pixels, including those corresponding to the child passengers 130 and/or 230. Each image in this embodiment is then segmented based on these identifying features, for instance using edge detection methods or clustering, possibly followed by post-processing steps, e.g., filtering for further noise reduction. The output file 46 is the result of block B104.

Figure 5:
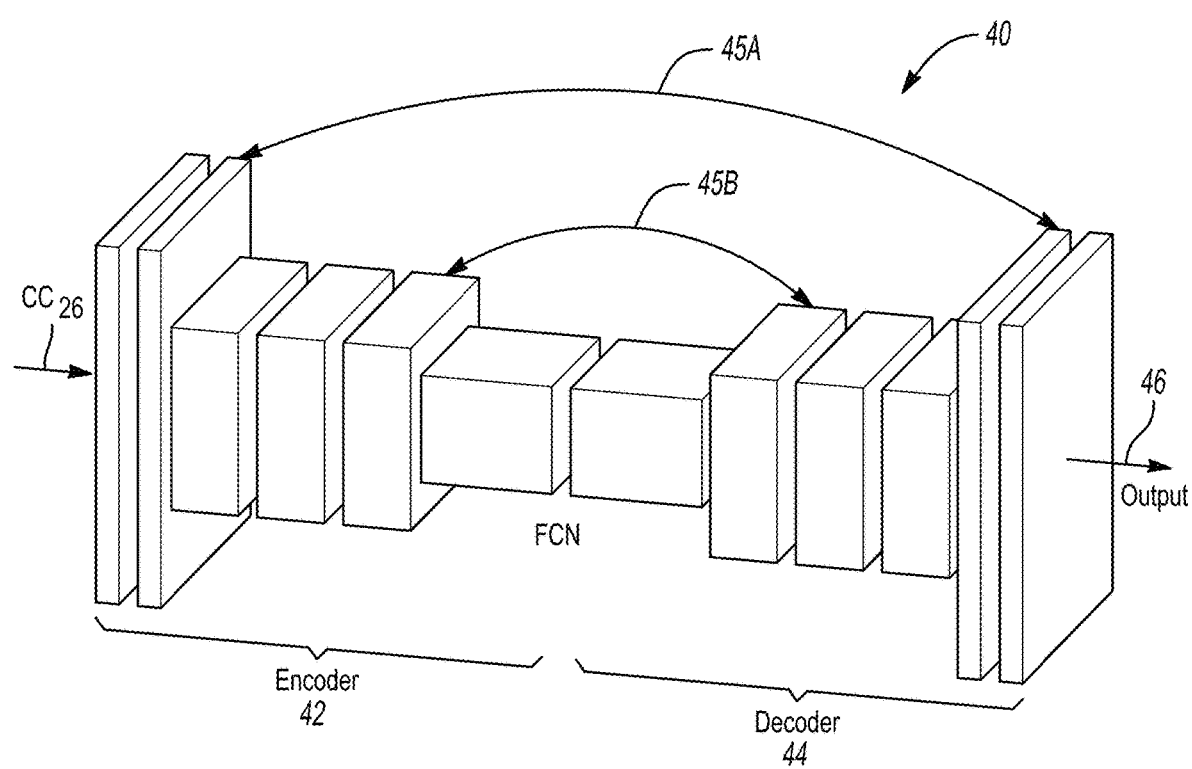
FIG. 5 is an illustration of a fully convolutional neural network for producing output data according to a representative embodiment.

Referring briefly to FIG. 5, in one or more embodiments block B104 may be performed using a fully-convolutional neural network (FCN) 40 as an exemplary machine learning (ML) technique. Here, the sensor data stream $CC_{26}$ is fed into an encoder layer 42 to a decoder layer 44, with the output file 46 ultimately generated via the decoder layer 44. To this end, the FCN 40 is pre-trained with labeled images of the target 25. For example, when training the ECU 50 to detect the CRS 18, a training data set may be used of different CRSs 18 arranged in various positions, orientations, and possibly with some level of obstruction (from child passengers 130 and/or 230, coats, blankets, toys, etc.). The various respective encoder and decoder layers 42 and 44 may be constructed using appropriate algorithms such as Faster R-CNN or Mask R-CN and trained on the above-described labeled dataset. Thus, block B104 presupposes the existence of a pre-trained model or FCN 40 for this purpose. Theoretically, multiple FCNs 40 may be used when detecting other targets 25 of FIG. 2. However, in practice a single FCN 40 may be trained to segment pixels of different targets 25 in a scene, which may be more efficient and less computationally intensive than using multiple FCNs.

As appreciated in the art, an FCN is a class of deep-learning architecture often used for performing image segmentation tasks, such as target detection as set forth herein. In contrast with convolutional neural networks which output a single class score for the entire input image, the contemplated FCN 40 of FIG. 5 assigns a class label to each pixel in a given input image. As shown in FIG. 2, the FCN 40 includes one or more encoder layers 42, one or more decoder layers 44, and various skip connections 45A, 45B. The pre-trained encoder layer(s) 42 are operable for extracting features from the input image, i.e., the encoder layer(s) 42 are pre-trained using large-scale image classification tasks. The decoder layer(s) 44 then up-sample feature maps from the encoder layer(s) 42 to produce the output file 46 as a segmentation map (M) as described below. Within the FCN 40, the skip connections 45A, 45B combine feature maps from the encoder layer(s) 42 with corresponding feature maps from the decoder layer(s) 44 to facilitate recovery of spatial and contextual information possibly lost during encoding, as appreciated by those of ordinary skill in the art of FCNs.

Figure 3B:
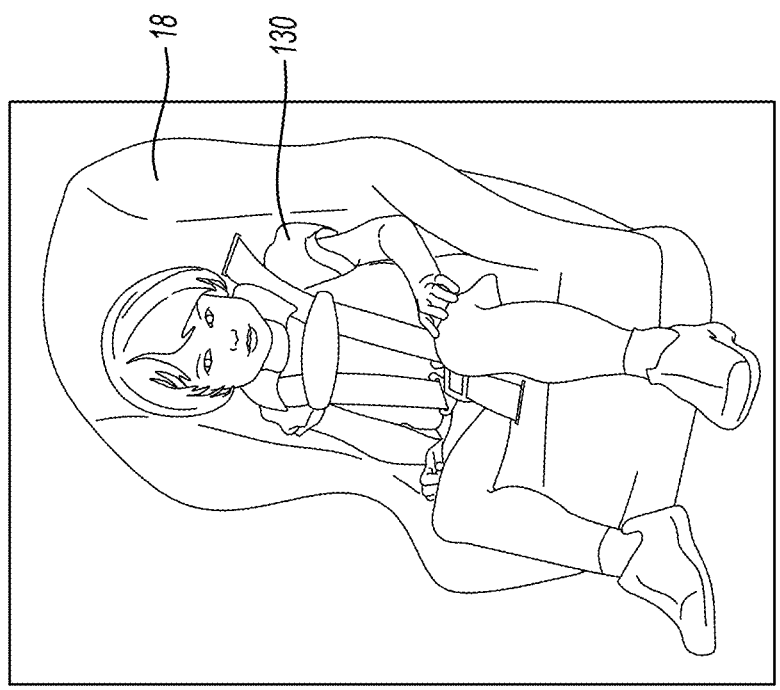

With respect to segmentation masks (M), the output file (O) 46 of the FCN 40 is a three-dimensional (3D) tensor with height (H), width (W), and a predetermined number of possible classes. Each pixel location in the output file 46 contains a vector of class scores/probabilities that the given pixel belongs to each of the classes. The argmax operation noted below is used to select the particular target class with the highest probability or score for each pixel location, with the result of the argmax operation being a two-dimensional (2D) tensor, i.e., width (W) and height (H). The 2D tensor is thus the segmentation mask (M) herein, assigning a class label to each image pixel in this exemplary embodiment. For visualization as shown in FIG. 3B, a color may be assigned to each label and overlaid on the collected image to depict detection results. For instance, an easily discernable color such as yellow may be overlaid on the displayed image of the CRS 18 so that the CRS 18 is clearly visible, or this may occur solely in logic of the ECU 50.

At block B106, the ECU 50 next calculates a segmentation mask (M) from the output file 46. For instance, the FCN 40 of FIG. 5 may generate predictions via the output file 46 in the form of bounding boxes or segmentation masks, e.g., the masked region 30 of FIG. 3B. This occurs by finding the 2D tensor of the dimension H×W having a maximum score. Thus, the ECU 50 may compute the segmentation mask (M) as:

$$M(x, y) = \arg\max O[x, y, :]; M \in \{0, 1\}^{H \times W}.$$

The method 100 then proceeds to block B108.

Block B108 of FIG. 4 entails closing or filling holes in the segmentation mask (M), e.g., using morphological closing. To close the segmentation mask M with respect to a kernel K:

$$M = (M \oplus K) \ominus K; K \in \{0, 1\}^{h \times w}.$$

The method 100 then proceeds to block B110. Block B110 includes extracting the largest fully-connected to select the largest fully-connected region in the segmentation mask M from amongst the various pixel clusters or regions. As part of this effort, the ECU 50 may apply a Depth First Search (DFS) to find clusters/regions of pixels $$\{R\}_1^N.$$

Once an unlabeled pixel is found, the ECU 50 may initiate DFS from that pixel and recursively explore every neighboring pixel that belongs to the same connected component, i.e., that has the same label or value in the segmentation mask (M). The ECU 50 may then compute the largest region as $R^* = \arg_R {}_{max}\Sigma_{x,y} \mathbb{1}[R(x,y)]$. The method 100 thereafter proceeds to block B111.

Still referring to FIG. 4, block B111 in this embodiment of method 100 includes determining, via the ECU 50, whether an area (A), height (H), and width (W) of the segmentation mask (M) exceed a corresponding threshold (T). As an example, the ECU 50 may calculate whether $\Sigma_{x,y}[R^*(x,y)] \geq T$, in which case R* corresponds to the CRS 18 (or other target 25 in other implementations). The method 100 then proceeds to block B112 when the area (A), height (H), and width (W) of the segmentation mask (M) does not exceed their corresponding threshold (T), and to block B114 in the alternative when the area, height, and width of the segmentation mask (M) exceeds the corresponding threshold (T).

At block B112, the ECU 50 of FIGS. 1 and 2 determines that the CRS 18 is not present in the sensor data stream $CC_{26}$. In response, the ECU 50 may abstain from performing a control action, given the lack of presence of the target 25. For example, if the ECU 50 is programmed to detect the CRS 18 and act accordingly when the CRS 18 is present, then the ECU 50 may determine that such a control action is not necessary, given that the CRS 18 is not present.

Using the above-noted airbag suppression example, for instance, the ECU 50 may transmit a bit code to another controller for the inflatable airbags 15 of FIG. 1 or other passenger restraints in the vehicle interior 14 to fully enable airbag deployment for inflatable airbags 15 situated in proximity to the seat surface 16S being monitored. Likewise, the ECU 50 may perform either no control action or an affirming control action for other targets 25, e.g., by illuminating a green light for view by an alighting passenger indicating that the passenger has not left the target 25 on the seat surface 16S. The method 100 is then complete, returning to block B102.

At block B114, the ECU 50 of FIGS. 1 and 2 determines that the CRS 18 is present in the sensor data stream $CC_{26}$. Block B114 may include recording a bit code that affirms the CRS 18 resides in the segmented mask (M). In response, the method 100 proceeds to block B116.

Block B116 includes extracting encoder features (F), i.e., the above-described features from the FCN 40 of FIG. 5, corresponding to pixels of the CRS 18. Such features (F) are available in memory 54 of the ECU 50 from performance of prior block B104. The method 100 then proceeds to block B118.

Block B118 of FIG. 4 includes classifying an orientation of the detected target 25 into a target class. For example, for the non-limiting example of the CRS 18, the target class may be forward-facing or rear-facing, or perhaps an incorrect or undefined orientation. Other target classes may be used for other targets 25, such as a horizontal or vertical orientation relative to the seat surface 16S on which the target 25 is detected. For the use case of the CRS 18, however, the orientation of the CRS 18 may be of particular use when informing control decisions, as the orientation is indicative of a likely posture and facing position of the child passengers 130 and/or 230 that may be seated in the CRS 18. An infant is typically secured in a rearward-facing seat, for example, in a rear seat, and therefore the location and orientation of the detected CRS 18 are of importance when determining how to respond. The method 100 then proceeds to block B120 once the ECU 50 determines the object class.

At block B120, the ECU 50 executes a control action in response to the target class of block B118. Examples include disabling or suppressing inflation of one or more of the inflatable airbags 15 of FIG. 1, as noted above. When the ECU 50 detects the CRS 18 and the opening of one of the doors of the motor vehicle 10, the ECU 50 may activate an audible and/or visible alert via the device 28 of FIG. 2 to draw attention to the possible presence of the child passenger 130, or to the possible presence of another target 25.

Using the teachings set forth above with reference to FIGS. 1-5, therefore, it is possible to implement vision and machine learning-based approaches to detecting, localizing, and tracking a target 25 within the vehicle interior 14 shown in FIG. 1. The solutions described below are highly invariant to illumination level, background, passenger pose, passenger size, CRS orientation, and vehicle interior/model, and therefore may be used in a wide range of applications to provide the disclosed benefits. Among other attendant benefits of the present application, owners or operators of the motor vehicle 10 may enjoy increased situational awareness of the present state of the target 25.

In terms of operation of the motor vehicle 10, the ECU 50 may seamlessly intervene in control of the inflatable airbags 15 of FIG. 1 or other onboard systems based on the results of the method 100 shown in FIG. 4, such as by suppressing or preventing inflation of the inflatable airbags 15 as noted above. When appropriate, the ECU 50 may elevate alerts to the owner/operator to draw attention to the seat surface 16S for possible presence of the target 25. That is, rather than always alerting an operator to check the seats 16 for objects or passengers, which may be excessive, e.g., for drivers who never transport child passengers 130 and/or 230, the present teachings may achieve similar protective ends in a less obtrusive manner. These and other potential benefits will be readily appreciated by those skilled in the art now having the benefit of the present teachings.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed is:

1. A target tracking system for use in a vehicle interior of a motor vehicle, comprising:
   a target sensor configured to output a sensor data stream of a seat surface in the vehicle interior; and
   an electronic control unit (ECU) in communication with the target sensor, the ECU including:
   a processor; and
   a non-transitory computer-readable storage medium on which is recorded instructions,
   wherein execution of the instructions by the processor causes the ECU to:
   receive the sensor data stream of the seat surface;
   segment the sensor data stream into an output file;
   detect a target on the seat surface using the output file, including:
   calculating a segmentation mask (M) from the output file, extracting a largest fully-connected region in the segmentation mask (M) using a Depth First Search (DFS) to identify pixel clusters or regions; and
   extracting the largest fully-connected region from amongst the pixel regions or clusters;
   classify the target into a target class; and
   execute a control action in response to the target class.

2. The target tracking system of claim 1, wherein the ECU includes a fully convolutional neural network (FCN), and wherein the execution of the instructions by the processor causes the ECU to segment the sensor data stream into the output file includes processing the sensor data stream via the FCN.

3. The target tracking system of claim 1, wherein the target sensor includes a red, green, blue (RGB) camera.

4. The target tracking system of claim 3, wherein the RGB camera includes an RGB depth (RGBD) camera.

5. The target tracking system of claim 3, wherein the RGB camera includes an RGB infrared (RGB-IR) camera.

6. The target tracking system of claim 1, wherein the execution of the instructions by the processor causes the ECU to execute the control action in response to the target class by selectively disabling a function of the motor vehicle based on the target class.

7. The target tracking system of claim 6, wherein:
   the target on the seat surface includes a child restraint system (CRS);
   the motor vehicle includes a plurality of airbags;
   the function of the motor vehicle includes an inflation of one or more of the airbags; and
   the target class includes an orientation of the CRS relative to the seat surface.

8. The target tracking system of claim 1, further comprising:
an external device in communication with the ECU, wherein the execution of the instructions by the processor causes the ECU to transmit a message to the external device as part of the control action.

9. A method for tracking a target in a vehicle interior of a motor vehicle, the method comprising:
receiving from a target sensor, via an electronic control unit (ECU) of the motor vehicle, a sensor data stream of a seat surface in the vehicle interior;
segmenting the sensor data stream into an output file via a fully convolutional neural network (FCN) of the ECU;
detecting the target on the seat surface using the output file from the FCN, including
calculating a segmentation mask (M) from the output file, extracting a largest fully-connected region in the segmentation mask (M) using a Depth First Search (DFS) to identify pixel clusters or regions, and extracting the largest fully-connected region from amongst the pixel regions or clusters;
classifying the target into a target class via the ECU; and
executing a control action, via the ECU, in response to the target class.

10. The method of claim 9, wherein executing the control action includes selectively disabling a function of the motor vehicle based on the target class.

11. The method of claim 10, wherein the target on the seat surface includes a child restraint system (CRS), the motor vehicle includes a plurality of airbags, the function of the motor vehicle includes inflation of one or more of the airbags, and the target class includes an orientation of the CRS relative to the seat surface.

12. The method of claim 9, wherein the target sensors includes a red, green, blue (RGB) camera, such that the receiving from the target sensor, via the ECU of the motor vehicle, the sensor data stream of the seat surface in the vehicle interior includes receiving the sensor data stream from the RGB camera.

13. The method of claim 12, wherein the RGB camera includes an RGB depth (RGBD) camera.

14. The method of claim 12, wherein the RGB camera includes an RGB infrared (RGB-IR) camera.

15. A motor vehicle comprising:
a vehicle body defining a vehicle interior; and
a target tracking system for use in the vehicle interior, the target tracking system comprising:
at least one target sensor connected to the vehicle body and situated in the vehicle interior, wherein the at least one target sensor is configured to output a sensor data stream of a seat surface in the vehicle interior, and wherein the target sensor includes a red, green, blue (RGB) camera; and
an electronic control unit (ECU) in communication with the at least one target sensor, the ECU being configured to:
receive the sensor data stream of the seat surface from the at least one target sensor;
segment the sensor data stream into an output file using a fully convolutional neural network (FCN);
detect a target on the seat surface using the output file, including calculating a segmentation mask (M) from the output file, extracting a largest fully-connected region in the segmentation mask (M) using a Depth First Search (DFS) to identify pixel clusters or regions, and extracting the largest fully-connected region from amongst the pixel regions or clusters;
classify the target into a target class; and
execute a control action in response to the target class.

16. The motor vehicle of claim 15, wherein the RGB camera includes an RGB depth (RGBD) camera.

17. The motor vehicle of claim 15, wherein the RGB camera includes an RGB infrared (RGB-IR) camera.

18. The motor vehicle of claim 15, further comprising:
a child restraint system (CRS); and
a plurality of airbags, wherein the function of the motor vehicle includes an inflation of one or more of the airbags, and the target class includes an orientation of the CRS relative to the seat surface.

* * * * *